US009394842B2

(12) United States Patent
Cunningham et al.

(10) Patent No.: US 9,394,842 B2
(45) Date of Patent: Jul. 19, 2016

(54) METHOD FOR IMPROVING ENGINE STARTING

(75) Inventors: Ralph Wayne Cunningham, Milan, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 829 days.

(21) Appl. No.: 13/324,923

(22) Filed: Dec. 13, 2011

(65) Prior Publication Data

US 2013/0146024 A1    Jun. 13, 2013

(51) Int. Cl.
*F02D 41/02*  (2006.01)
*F02D 41/00*  (2006.01)
*F02D 37/02*  (2006.01)
*F02P 5/15*   (2006.01)

(52) U.S. Cl.
CPC ............ *F02D 41/0255* (2013.01); *F02D 37/02* (2013.01); *F02D 41/0002* (2013.01); *F02P 5/1506* (2013.01); *Y02T 10/26* (2013.01); *Y02T 10/42* (2013.01); *Y02T 10/46* (2013.01)

(58) Field of Classification Search
CPC ............ F02D 41/024; F02D 13/0219; F02D 2200/0404; F02D 41/005; F02D 41/0245; F02D 2200/021; F02D 31/003; F02D 41/0255; F02D 2200/0802; F02D 41/064; F02D 41/065; F02D 41/068; F02D 2200/1006; F02D 41/0002; F02D 41/06; F02D 37/02; F02D 2041/001; F02D 41/1446; F02D 35/0023; F02P 5/1508; F02P 17/02; F02M 27/02; F02N 2200/026

USPC ............ 701/113; 123/406.19, 406.72, 179.3, 123/339.11, 491, 339.1, 406.5, 406.23, 123/406.24, 406.35, 406.44, 406.53, 179.5, 123/65 E, 65 VC, 393, 406.48, 672, 676, 366
See application file for complete search history.

(56) References Cited

U.S. PATENT DOCUMENTS

| | | | | | |
|---|---|---|---|---|---|
| 3,851,469 | A | * | 12/1974 | Eichler et al. | 60/277 |
| 4,153,652 | A | * | 5/1979 | Ogita | F02M 7/28 123/586 |
| 4,205,636 | A | * | 6/1980 | Kimata | F02D 41/32 123/455 |
| 4,341,190 | A | * | 7/1982 | Ishikawa | F02M 7/24 123/439 |
| 4,454,855 | A | * | 6/1984 | Otobe | F02M 25/0777 123/478 |
| 5,347,971 | A | * | 9/1994 | Kobayashi | F02M 25/0809 123/198 D |
| 5,419,122 | A | * | 5/1995 | Tabe et al. | 60/274 |
| 5,459,998 | A | * | 10/1995 | Hosoya et al. | 60/284 |
| 5,657,625 | A | * | 8/1997 | Koga et al. | 60/274 |
| 5,740,045 | A | * | 4/1998 | Livshiz | F02P 5/1504 123/339.19 |
| 6,202,406 | B1 | * | 3/2001 | Griffin et al. | 60/274 |

(Continued)

OTHER PUBLICATIONS

Partial Translation of Office Action of Chinese Application No. 2012104913700, Issued Feb. 2, 2016, State Intellectual Property Office of PRC, 13 Pages.

*Primary Examiner* — Hung Q Nguyen
*Assistant Examiner* — Brian P Monahon
(74) *Attorney, Agent, or Firm* — Julia Voutyras; Alleman Hall McCoy Russell & Tuttle LLP

(57) ABSTRACT

A method for improving exhaust after treatment initial warm up during engine starting is presented. In one example, the method adjusts an engine air flow amount to a level where a desired substantially constant heat flux is provided by the engine to an exhaust after treatment device. The method may reduce fuel consumption and a need for a vacuum pump to provide vacuum to vacuum consumers of a vehicle during exhaust after treatment heating.

19 Claims, 5 Drawing Sheets

(56) References Cited

U.S. PATENT DOCUMENTS

| | | | |
|---|---|---|---|
| 6,278,933 B1* | 8/2001 | Buckland et al. | 701/104 |
| 6,491,024 B1* | 12/2002 | Connolly | F02D 41/06 |
| | | | 123/406.19 |
| 6,651,422 B1* | 11/2003 | LeGare | 60/277 |
| 6,935,306 B2 | 8/2005 | Surnilla et al. | |
| 7,418,943 B2* | 9/2008 | Reynolds et al. | 123/339.11 |
| 2002/0095932 A1 | 7/2002 | Izumiura et al. | |
| 2002/0160879 A1 | 10/2002 | Kidokoro et al. | |
| 2005/0098152 A1* | 5/2005 | Surnilla et al. | 123/339.11 |
| 2006/0201136 A1* | 9/2006 | Ament | 60/284 |
| 2008/0133112 A1 | 6/2008 | Reynolds et al. | |
| 2009/0025371 A1* | 1/2009 | Hermansson et al. | 60/286 |
| 2009/0150059 A1* | 6/2009 | Santoso et al. | 701/113 |
| 2009/0151693 A1* | 6/2009 | Ono | 123/339.11 |
| 2009/0216427 A1* | 8/2009 | Yamakawa et al. | 701/103 |
| 2010/0004844 A1 | 1/2010 | Hirooka | |
| 2010/0017095 A1* | 1/2010 | Soejima et al. | 701/102 |
| 2010/0108031 A1* | 5/2010 | Pursifull | F02P 5/1508 |
| | | | 123/406.5 |
| 2010/0108032 A1* | 5/2010 | Pursifull et al. | 123/406.12 |
| 2010/0268436 A1* | 10/2010 | Soejima | F02D 37/02 |
| | | | 701/102 |
| 2011/0072793 A1* | 3/2011 | Bidner et al. | 60/285 |
| 2011/0301828 A1* | 12/2011 | Moriya | F02D 35/023 |
| | | | 701/105 |

* cited by examiner

METHOD FOR IMPROVING ENGINE STARTING

FIELD

The present description relates to a method for controlling an engine during starting. The method may be particularly useful for engines that are boosted to increase engine performance.

BACKGROUND AND SUMMARY

An engine having an exhaust after treatment system may produce its highest concentration of regulated tailpipe exhaust emissions during engine starting when the after treatments system may be operating at a lower level of efficiency. One way to reduce tailpipe emissions is to rapidly heat the exhaust after treatment system so that the exhaust after treatment system may more efficiently convert regulated gases. The exhaust after treatment system may be heated more rapidly via increasing an exhaust mass flow rate to the after treatment system. However, increasing the exhaust gas flow rate beyond what is required for rapid catalyst heating may increase fuel consumption more than is desired. Further, increasing the exhaust mass flow rate may require increasing the engine air mass flow, and increasing the engine air mass flow may interfere with providing vacuum to operate vacuum actuators. In addition, when external loads are applied to the engine, the engine air flow rate (and thus exhaust mass flow rate) may be further increased to compensate for the increased engine load. Consequently, engine exhaust heating rate may be increased as engine load increases while there may be no need or desire to provide higher engine exhaust heating rate.

The inventors herein have recognized the above-mentioned disadvantages of engine starting and have developed an engine starting method, comprising: providing a substantially constant air mass to the engine after engine run-up until a predetermined condition; retarding spark timing from MBT timing to provide a torque to achieve a desired engine idle speed while the engine inducts the substantially constant air amount; and advancing spark in response to an increase in engine load while the engine inducts the substantially constant air mass.

By providing a substantially constant air mass to an engine after run-up, it may be possible to limit unnecessary fuel consumption and elevated exhaust gas temperatures that may not be necessary or desirable during some engine operating conditions. Further, it may be possible to provide a desired level of vacuum even during changes in engine load when the engine operates at a substantially constant air mass flow rate. For example, an engine air mass flow rate that provides a desired level of heat flux may be commanded via adjusting throttle position or valve timing. The engine air mass flow rate may be selected such that the engine provides a desired level of vacuum when operated at the selected engine air mass flow rate. Additionally, since the engine air mass flow rate is held constant during the engine/exhaust after treatment heating period, additional unrequested heat is not provided by the engine to the exhaust system when limited engine load changes occur.

The present description may provide several advantages. Specifically, the approach may reduce unnecessary fuel consumption during engine heating. Further, the approach may allow an engine to provide more uniform vacuum for vacuum consumers during starting. Further still, engine emissions may be reduced from the engine because a substantially constant air flow through the engine allows for substantially constant fueling and a reduction of the possibility of air-fuel errors during engine starting when conversion efficiency of exhaust after treatment devices may be low.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where.

DETAILED DESCRIPTION

Figure 1:
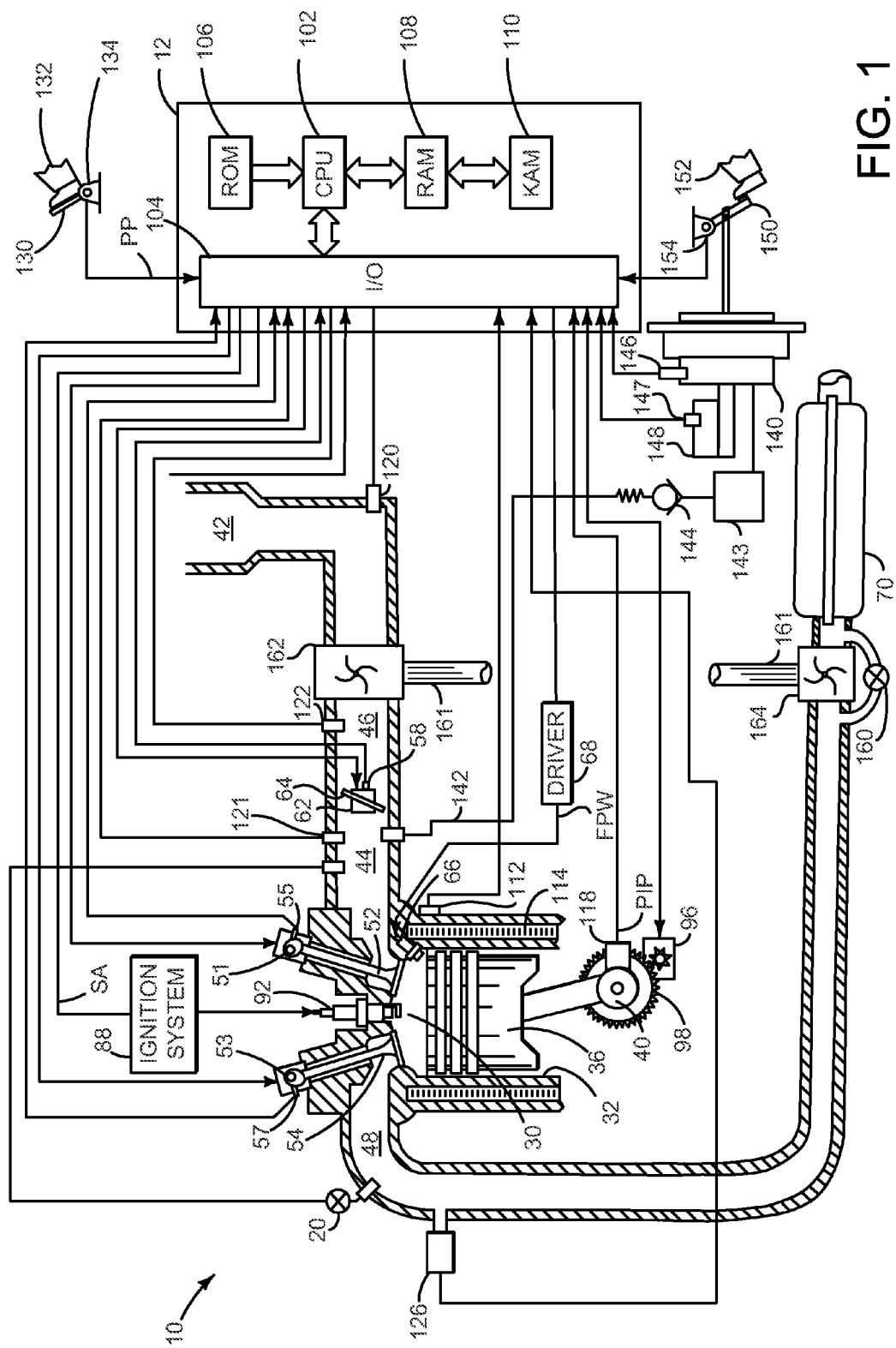
FIG. 1 is a schematic diagram of an engine.
Figure 2:
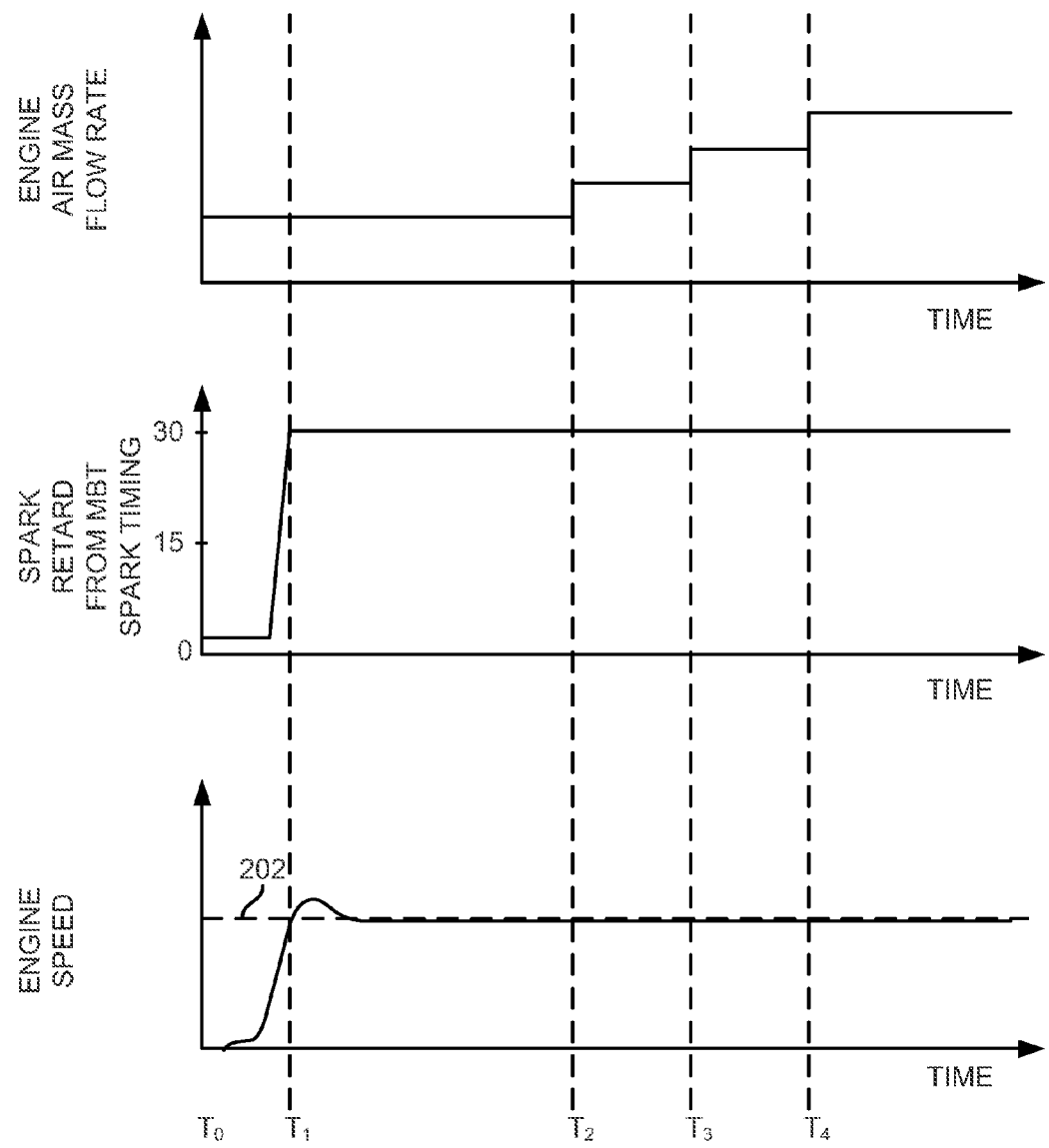
FIG. 2 is a plot showing a prior art method for starting an engine.
Figure 3:
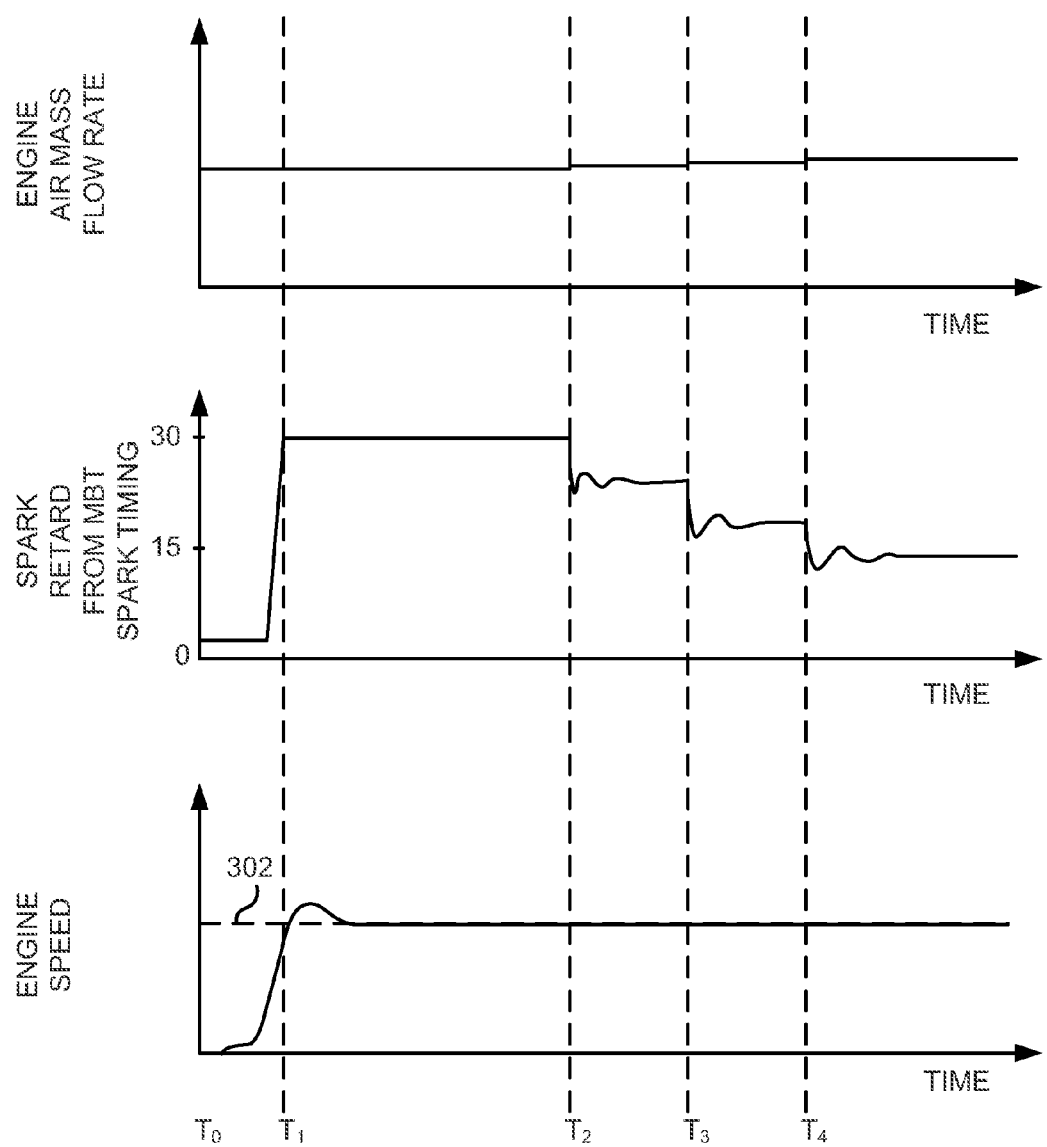
FIG. 3 is a plot showing an example engine starting sequence according to the method of FIG. 4.
Figure 4:
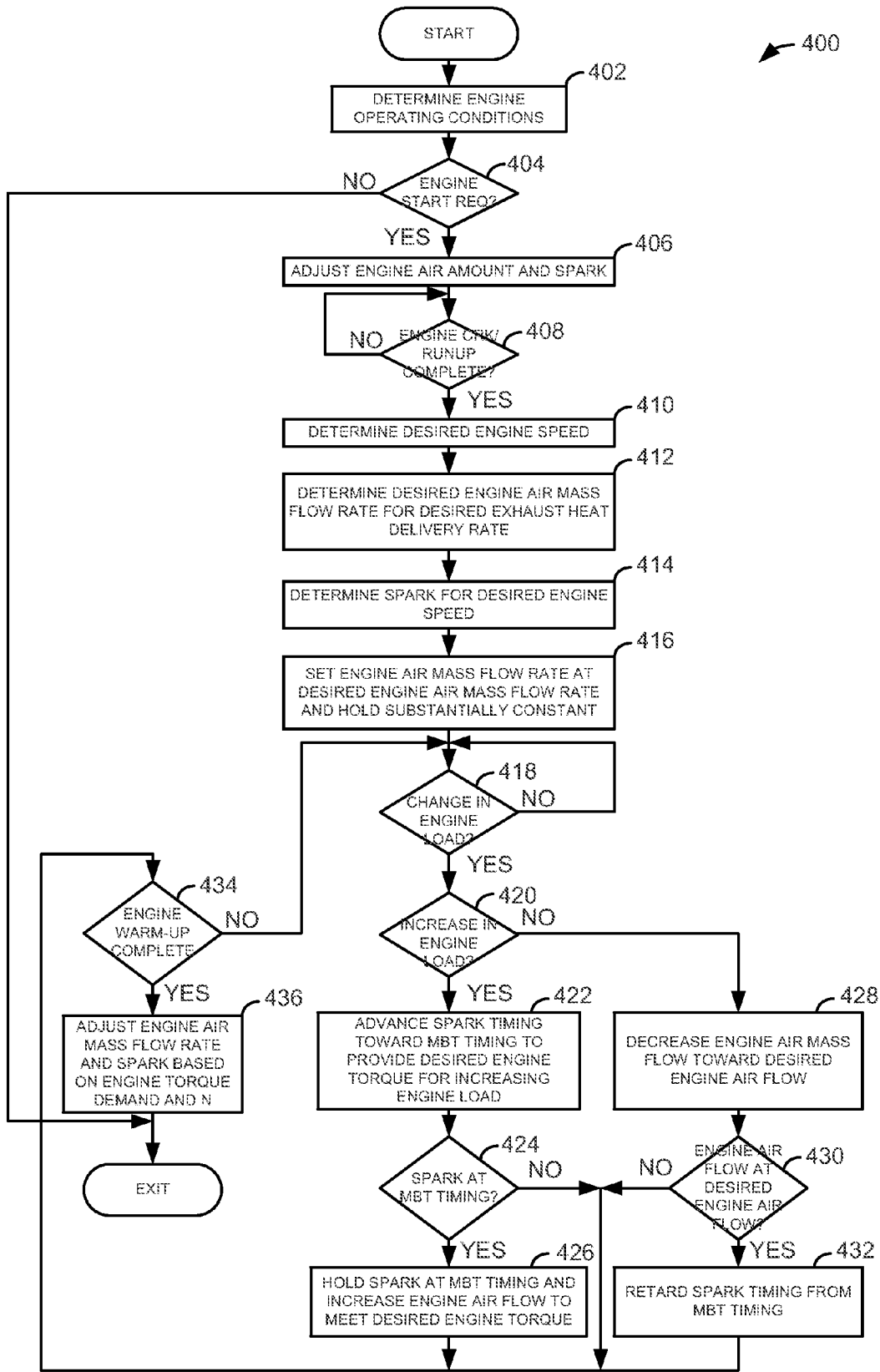
FIG. 4 is a flowchart of an example method for starting an engine.
Figure 5:
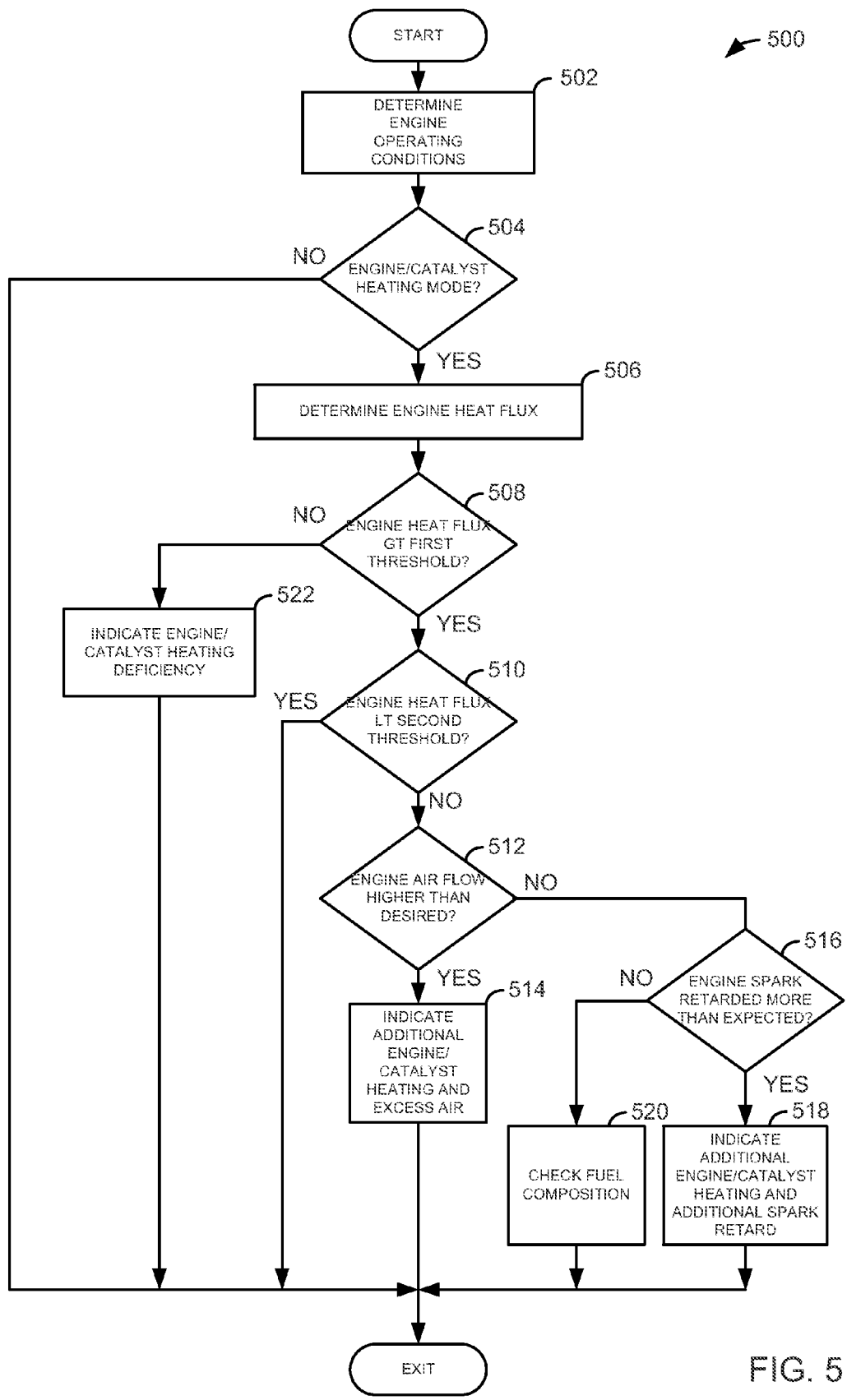
FIG. 5 is a flowchart of an example method for diagnosing engine starting according to the method of FIG. 4.

The present description is related to starting an engine and providing a desired level of heat flux from an engine during an engine warm-up period. In one non-limiting example, the engine may be configured in a system as illustrated in FIG. 1. In this example, the engine is a source of vacuum for operating vacuum consumers (e.g., brake booster, evaporative emission purging, turbo charger waste gate, etc.). FIG. 2 shows prior art method for starting an engine. Example signals of interest when an engine is started via the method described herein are illustrated in FIG. 3. A flowchart of a method to control engine starting is shown in FIG. 4. The method of FIG. 4 describes spark timing adjustments as well as engine air mass flow adjustments during different engine operating conditions. A diagnostic to establish whether or not an engine is operating in a desired manner during a start is illustrated in FIG. 5. The methods of FIGS. 4 and 5 are executable via instructions in the controller shown in FIG. 1.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 98 is coupled to crankshaft 40 and may be rotated via starter 96. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Compressor 162 draws air from air intake 42 to supply boost chamber 46. Exhaust gases spin turbine 164 which is coupled to compressor 162 via shaft 161. Vacuum operated waste gate actuator 160 allows exhaust gases to bypass turbine 164 so that boost pressure can be controlled under varying operating conditions.

Fuel injector 66 is shown positioned to inject fuel directly into combustion chamber 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. Intake manifold 44 also provides vacuum to brake booster 140 via conduit 142. Check valve 144 ensures air flows from brake booster 140 to intake manifold 44 and not from intake manifold 44 to brake booster 140. Brake booster 140 amplifies force provided by foot 152 via brake pedal 150 to master cylinder 148 for applying vehicle brakes (not shown). Vacuum reservoir 143 provides additional volume for storing vacuum available to brake booster 140 and other vacuum consumers.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

EGR valve 20 controls flow of exhaust gases from exhaust manifold 48 to intake manifold 44. Controller 12 may control a position of EGR valve 20 based on engine speed and load. In alternative examples, the EGR valve may control exhaust flow from downstream of turbine 164 to the air intake 42 upstream of compressor 162.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing brake pedal position, a pressure sensor 146 for sensing brake booster vacuum; a pressure sensor 147 for sensing master cylinder pressure (e.g., hydraulic brake pressure) a measurement of engine manifold pressure (MAP) from pressure sensor 121 coupled to intake manifold 44; boost chamber pressure from pressure sensor 122; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system for starting an engine coupled to a transmission, comprising: an engine; an exhaust after treatment device coupled to the engine; and a controller including instructions to provide a substantially constant heat flux from the engine to the exhaust after treatment device in response to a change in engine load. In one example, the system includes further controller instructions to adjust ignition timing in response to the change in engine load. The system includes further controller instructions to advance spark timing to MBT spark timing and hold spark timing at MBT spark timing while increasing engine air flow in response to the change in engine load. Thus, the system provides torque via spark timing until engine torque reaches the engine torque capacity at the desired engine air mass flow rate.

The system also includes where the controller included further instructions to retard spark timing from MBT spark timing while the engine is providing the substantially constant heat flux. The system also includes where the substantially constant heat flux is provided via inducting a substantially constant air flow into the engine. The system further comprises a throttle coupled to the engine and further controller instructions to operate the throttle to provide the substantially constant air flow to the engine via the throttle.

FIG. 2 is a plot showing a prior art method for starting an engine. The prior art method for starting the engine attempts to increase exhaust gas temperatures while holding the engine at a desired idle speed.

The first plot from the top of FIG. 2 represents commanded engine air mass flow rate versus time. The Y axis represents commanded or desired engine air mass flow rate and commanded engine air mass flow rate increases in the direction of the Y axis arrow. Time increases from left side of the plot to right side of the plot.

The second plot from the top of FIG. 2 represents engine spark retard away from minimum spark advance timing for best engine torque (e.g. MBT spark timing) versus time. The Y axis represents engine spark timing from MBT spark timing and the amount of spark retard from MBT spark timing increases in the direction of the Y axis arrow. Time increases from the left side of the plot to the right side of the plot. MBT spark timing is commanded when the spark retard amount is zero.

The third plot from the top of FIG. 2 represents engine speed versus time. The Y axis represents engine speed and engine speed increases in the direction of the Y axis arrow. Time increases from the left side of the plot to the right side of the plot.

At time $T_0$, the engine is stopped. Although the engine is stopped, the controller commands a desired engine air mass flow rate and spark timing that is based on the desired engine speed as well as a desired level of catalyst heating. The engine throttle is prepositioned so that the desired engine air mass is provided when the engine reaches idle speed. The spark timing is shown retarded a small amount from MBT spark timing. Spark is delivered at the timing shown during engine cranking and run-up. Additionally, the engine air mass flow and spark timing between time $T_0$ and $T_1$ after engine run-up is sufficient to heat an exhaust after treatment device to a level where the exhaust after treatment device converts exhaust gases at a desired efficiency.

Between time $T_0$ and time $T_1$, the engine is cranked via a starter and accelerates up to a desired engine idle speed indicated by horizontal marker 202. The engine spark timing is also retarded further during engine run-up (e.g., the time between cranking and desired engine idle speed). The engine spark retard is held at a more retarded level after reaching time $T_1$ and spark timing may be slowly advanced from the retarded timing as exhaust system temperature increases. The commanded engine air mass flow rate is shown held steady during cranking, run-up, and after idle speed is achieved. However, in some examples, the engine air mass flow rate may be commanded to different levels or values during cranking and run-up as compared to when the engine reaches idle speed.

At time $T_2$, a load is applied to the engine that was not applied to the engine during cranking, run-up, and during the initial engine idle period between time $T_1$ and time $T_2$. In this example, the additional engine load is due to engaging a transmission coupled to the engine into drive from neutral or park. Since the spark timing is retarded to a larger extent when the engine load is changed, the engine air mass flow is increased to provide the additional engine torque to operate the engine at the desired idle speed. This increased air flow rate necessitated by the additional engine load, increases the exhaust heat rate that raises the temperature of the catalyst. The engine idle speed remains substantially constant since the increased engine load is compensated with additional engine torque that results from increasing the cylinder air amount.

At time $T_3$, engine load is increased for a second time during the engine idle period. The engine load increase at time $T_3$ is indicative of engaging an air-conditioner load to the engine. The spark timing remains retarded and the engine air mass flow rate is increased again to further increase engine torque. The engine heat flux output also increases as the engine air mass flow is increased. Increasing the cylinder air mass flow allows the engine to continue to operating at the desired engine idle speed.

At time $T_4$, engine load is increased a final time during the idle period. The engine load increase at time $T_4$ is indicative of an engine load increase in response to an increase in alternator load. Similar to at times $T_2$ and $T_3$, the commanded engine air mass flow rate is increased so that additional torque is provided by the engine to compensate for the higher engine load applied to the engine via the alternator. The additional commanded engine air mass flow rate allows the engine to remain at substantially the same engine idle speed. The additional commanded engine air mass flow rate also increases the engine heat flux output to exhaust after treatment devices. However, the increased heat flux output from the engine may also increase fuel consumption by the engine.

Referring to FIG. 3, a plot of a simulated engine starting sequence according to the method of FIG. 4 is shown. The signals illustrated in FIG. 3 may be provided via controller 12 of FIG. 1 executing instructions of the method illustrated in FIG. 4. The signals shown in FIG. 3 are the same type of signals as are shown in FIG. 2. Therefore, description of the signals in FIG. 3 is limited to the new characteristics shown for the sake of brevity.

At time $T_0$, the engine is stopped. Spark is shown commanded to a slightly retarded level during cranking and run-up. The spark command is advanced more significantly toward MBT spark timing than compared to spark timing after the engine reaches the desired engine idle speed indicated by horizontal marker 302. The engine is cranked and runs up between time $T_0$ and time $T_1$.

At time $T_1$, the engine reaches engine idle speed and engine spark timing is retarded. The engine air mass flow rate remains commanded to a constant level and a substantially constant engine air mass flow rate is inducted by the engine. The engine speed stays at the desired engine idle speed when the spark is retarded. The engine air mass flow rate may be adjusted to the constant level via adjusting a position of a throttle and/or cam timing to vary valve timing. However, the throttle position, EGR valve position, and cam timing are held constant when the engine air mass flow reaches the requested constant engine air mass flow.

Between time $T_1$ and time $T_2$, the commanded engine air mass is commanded at a substantially constant level that allows the engine to provide a substantially constant desired engine exhaust after treatment heating amount (e.g., a desired engine thermal output in Watts) whether the spark timing is retarded to the level at time $T_1$ or time $T_4$. In some examples, the engine air flow amount is also an engine air flow amount that allows the engine to produce a desired level of vacuum in the engine intake manifold during the engine idle period for a given barometric pressure. For example, the engine may be commanded to an air mass flow rate of X gm/second at an altitude of 2000 meters so that the engine provides a prescribed amount of exhaust after treatment device heating and a prescribed amount of vacuum during engine idle periods. On the other hand, when the same engine is commanded to the same air mass at an altitude of 100 meters, the engine provides significantly more vacuum but substantially the same amount of exhaust after treatment device heating. In this way, the engine air mass flow rate may be adjusted or commanded to a level that provides a desired amount of heat to the exhaust system and a desired level of vacuum in the engine intake manifold.

At time $T_2$, a transmission coupled to the engine is engaged in drive from neutral or park. The spark timing is advanced to increase engine torque while the engine air mass flow rate is held substantially constant. In one example, the spark timing is advanced based on empirical data stored in controller memory. In particular, when the transmission is engaged in drive, a table outputs a spark value amount that is added to a base spark command to advance spark timing toward MBT spark timing. Advancing spark timing increases energy delivered to the crankshaft and to a lesser extent lowers heat rejected to the exhaust. However, the heat lost in the exhaust gases due to advancing spark is minimal compared to the heat resulting from the engine mass flow rate. Thus, the engine heat flux remains substantially constant as spark timing is advanced. As a result, exhaust heat energy delivered from the engine to the exhaust after treatment device remains high enough to raise the exhaust after treatment device temperature at the desired rate. The spark timing is shown wavering slightly in an effort to maintain a desired engine idle speed. The spark timing is controlled close-loop and responsive to engine speed as well as the change in engine load. The engine idle speed remains substantially constant as does the engine air mass flow rate during and after the engine load change.

At time $T_3$, an air conditioning system coupled to the engine is engaged to cool a cabin of a vehicle in which the engine is located. The spark timing is again advanced to increase engine torque while the engine air mass flow rate is held substantially constant. In one example, the spark timing is advanced based on empirical data stored in controller memory. In particular, when the air conditioner is engaged, a table outputs a spark value amount based on the change in air conditioner load that is added to a base spark command to advance spark timing toward MBT spark timing. The spark timing is shown wavering slightly in an effort to maintain a desired engine idle speed. The spark timing is controlled close-loop and responsive to engine speed as well as the change in engine load. The engine idle speed remains substantially constant as does the engine air mass flow rate during and after the engine load change.

At time $T_4$, an alternator coupled to the engine is engaged to provide electrical power to an electrical load. The spark timing is again advanced to increase engine torque while the engine air mass flow rate is held substantially constant. In one example, the spark timing is advanced based on empirical data stored in controller memory. In particular, when the alternator field current is increased, a table outputs a spark value amount based on the change in alternator field current that is added to a base spark command to advance spark timing toward MBT spark timing. The spark timing is shown wavering slightly in an effort to maintain a desired engine idle speed. The spark timing is controlled close-loop and responsive to engine speed as well as the change in engine load. The engine idle speed remains substantially constant as does the engine air mass flow rate during and after the engine load change.

In this way, engine torque may be adjusted by varying spark timing while engine air mass flow rate is held substantially constant. The spark timing may be advanced when loads are added to the engine and spark timing may be retarded when loads are removed from the engine. Further, the amount of exhaust energy delivered to an exhaust after treatment device from the engine is substantially constant.

Should an engine torque be encountered that is too large to be accommodated through spark advance alone, then and only then would air flow rate be increased.

Referring now to FIG. 4, a flowchart of a method for starting an engine is shown. The method is executable via instructions in a controller such as is shown in FIG. 1.

At 402, method 400 determines engine operating conditions. Engine operating conditions may included but are not limited to engine speed, engine load, barometric pressure, throttle position, spark timing commands, engine temperature, and ambient temperature. Method 400 proceeds to 404 after engine operating conditions are determined.

At 404, method 400 judges whether or not engine starting is requested. If so, the answer is yes and method 400 proceeds to 406. Otherwise, the answer is no and method 400 exits.

At 406, method 400 adjusts for an engine air mass flow and engine spark timing for cranking and run-up. Engine air mass flow may be adjusted via setting a position of a throttle during crank and run-up based on barometric pressure. Engine spark timing may be adjusted according to engine speed and estimated engine air mass flow during cranking and run-up. Engine air mass flow and engine spark timing may be empirically determined and stored in memory for retrieval during engine starting. Method 400 proceeds to 408 after engine spark timing and engine air mass flow are adjusted.

At 408, method 400 judges whether or not the engine has exited cranking and run-up. In one example, method 400 is judged to exit cranking and run-up when engine speed reaches a desired engine idle speed. If method 400 judges that the engine has exited crank and run-up, the answer is yes and method 400 proceeds to 410. Otherwise, the answer is no and method 400 returns to 408 until the engine exits crank and run-up.

At 410, method 400 determines a desired engine speed. The desired engine speed is initially set to a desired engine idle speed (e.g. 700 RPM). The desired engine idle speed and thus the desired engine speed can be increased based on engine operating conditions. For example, 300 RPM may be added to the desired engine idle speed at colder engine conditions to shorten a time period between combustion events during colder conditions so that the engine runs smoother and can provide a higher exhaust mass flow rate. In one example, the desired engine speed is stored in tables or functions that are indexed by engine operating conditions. The desired engine speed may be adjusted for engine operating conditions such as engine temperature and ambient temperature. Method 400 proceeds to 412 after desired engine speed is determined.

At 412, method 400 determines desired engine air mass flow rate for a desired exhaust gas energy delivery rate. In one example, the desired exhaust gas energy delivery rate Q is based on the mass of an exhaust after treatment device being heated and a desired amount of time to heat the exhaust after treatment device to a desired temperature. For example, it may be empirically determined that it takes 6 kW of energy to heat a particular 0.5 Kg catalyst to a desired temperature in 20 seconds when the engine is started at a temperature of 20° C. The engine air mass flow rate may be determined from the heat delivery rate according to the following equation:

$$\text{HeatFlux} = Q = ((\text{air\_mass\_flow\_rate} \cdot (1 - \text{fuel\_air\_ratio})) \cdot (0.152 \cdot (\text{exhaust\_tempK}^2 + 952) \cdot (\text{exhaust\_tempK} - 294829)) - (0.5 \cdot (\text{FEAD\_power} + \text{trans\_input\_power}))$$

where air_mass_flow_rate is the engine air mass flow rate, fuel_air_ratio is the engine fuel-air ratio, exhaust_tempK is exhaust gas temperature in degrees Kelvin, FEAD_power is power to rotate engine front end accessories (e.g., power steering pumps, vacuum pumps, air conditioner, etc.), and trans_input_power is power input to the transmission. Engine exhaust temperatures may be estimated or measured. FEAD power requirements may be empirically determined and stored in memory for retrieval upon demand. Similarly, engine power requirements for rotating the engine at a desired idle speed when the transmission is in neutral and/or drive may also be stored in memory and retrieved on request. Thus, the desired engine air mass flow rate can be determined from the heat flux, and the heat flux may be determined from empirical data stored in tables and/or functions that may be indexed using engine operating conditions. For example, the empirically determined heat flux tables may be indexed based on an engine temperature and ambient temperature of 20° C. The heat flux tables may output a value of 6 kW from which the engine air mass flow rate is based.

The amount of desired engine heat flux, and therefore the engine air mass flow rate, may be set to a level where the desired engine idle speed may be achieved at spark timing retarded from MBT spark timing. For example, the engine air flow that provides the desire heat flux may be greater than the engine air flow necessary to operate the engine at a desired idle speed when spark timing is near MBT spark timing. Further, the desired engine heat flux and air mass flow rate may be set to levels where a desired intake manifold vacuum may be provided. In other words, the desired engine heat flux may be provided at engine air mass flow rates that are less than engine air mass flow rates that allow the engine to provide a threshold level of vacuum to vacuum consumers via a low intake manifold pressure.

In other examples, the engine air mass flow rate may be set to a value that stays constant after an engine start but that varies from engine start to engine start based on engine operating conditions. For example, the desired or commanded engine air mass flow rate may be increased at lower engine temperatures and increased for higher engine temperatures at the time of start, but once the desired or commanded engine air mass flow rate is set at start, it may stay at the set value until predetermined operating conditions are met. Method 400 proceeds to 414 after the desired engine heat flux and engine air mass flow rates are determined.

At 414, method 400 determines spark timing for the desired engine speed at the engine air flow rate that provides the desired engine heat flux to the exhaust after treatment device. Specifically, in one example, a variable base_torque, describes an amount of engine torque that rotates the engine at the desired engine speed. The variable is calculated or empirically determined and stored in memory. A second variable, MBT_torque, describes an amount of engine torque that may be provided by the engine when the engine is operated at MBT spark timing, at the desired engine speed, and with the engine air mass flow rate that provides the desired heat flux. The variable is calculated or empirically determined and stored in memory. Additionally, a spark retard amount Spk_retard, is an output of a function or table that outputs spark retard based on a fractional engine torque reduction amount from engine torque at MBT spark timing.

Spk_retard is determined by dividing base_torque by MBT_torque and then indexing the table or function that describes spark retard based on the fractional engine torque reduction. The table outputs the spark reduction amount Spk_retard and the desired spark timing may be determined by subtracting the Spk_retard from MBT spark timing. MBT spark timing is empirically determined and stored in memory based on engine speed and load. In this way, engine spark timing is determined based on the desired engine air mass flow that provides a desired level of heat flux to an exhaust after treatment device and a desired engine speed. Method 400 proceeds to 416 after desired spark timing and desired engine air mass flow are determined.

At 416, method 400 adjusts the engine air mass flow rate to the desired engine air mass flow rate and holds the engine air mass flow rate substantially constant. The engine air mass flow rate may be adjusted by opening or closing a throttle and/or adjusting valve timing. For example, a position of a throttle plate may be adjusted based on a pressure drop across the throttle to provide a desired engine air mass flow rate. In other examples, engine air mass flow rate may be adjusted by adjusting intake manifold pressure to a pressure that provides the desired engine air mass flow rate. However, once the desired engine air mass flow rate is achieved, the throttle and cam timing are held substantially constant. Spark timing is also adjusted to the spark timing determined at 414. In some examples as mentioned, the desired or commanded engine air amount may be adjusted at time of start based on engine operating conditions. Once the desired or commanded engine air amount is set it may be held at a constant value until predetermined engine operating conditions are reached. Method 400 proceeds to 418 after engine air mass flow rate is adjusted to a substantially constant level and after spark timing is set.

At 418, method 400 judges whether or not there is a change in engine load. A change in engine load may be made via applying an external load to the engine or via an increased torque request from an operator. For example, a change in engine load may occur when a transmission is engaged to drive from neutral. In another example, a change in engine load may occur when a drive requests additional engine torque via depressing a throttle. If method 400 determines a change is engine load is present the answer is yes and method 400 proceeds to 420. Otherwise, the answer is no and method 400 returns to 418 where the engine air mass flow is held substantially constant and engine spark timing is adjusted to hold the desired engine speed.

At 422, method 400 advances spark timing toward MBT spark timing to provide a desired engine torque for an increasing engine load. The amount of spark adjustment may be based on an estimate or calculation of the increase in engine load. For example, it may be empirically determined that 4 NM of additional engine torque are required to rotate a transmission that is transitioned from neutral to drive. Further, the amount that spark timing may be advanced may be based on the tables and method described at 414. For example, if the engine load is changed and engine torque is moved toward engine torque at MBT spark timing while the engine operates at the desired heat flux and engine air mass flow rate, the spark retard variable Spk_retard is decreased and spark timing advances toward MBT spark timing. The present engine torque demand (e.g. a sum of engine friction torque, engine pumping torque, and external load applied to the engine) is divided by MBT_torque and the table describing spark retard based on fractional engine torque reduction is indexed so that a revised value of Spk_retard is output. Thus, the engine air mass flow rate and the engine heat flux remain substantially constant, and spark timing is advanced to compensate for the increased engine load.

Spark timing is also adjusted in response to engine speed. If engine speed is higher than desired, spark timing is retarded. If engine speed is less than desired, spark timing is advanced. Thus, spark timing is adjusted closed-loop with engine speed to maintain a desired engine speed (e.g., desired engine idle speed). Method 400 proceeds to 424 after engine spark timing is advanced toward MBT spark timing where the engine is inducting the desire engine air mass flow rate and operating at the desired engine speed.

It should be noted that MBT spark timing changes with engine speed and load. Therefore, whenever MBT spark timing advances due to engine operating conditions, spark timing is advanced toward MBT spark timing before engine air mass flow rate is increased.

At 424, method 400 judges whether or not spark timing is at MBT spark timing. If engine spark timing is at MBT spark timing the answer is yes and method 400 proceeds to 426. Otherwise, the answer is no and method 400 proceeds to 434. It should be noted that in some examples throttle position, cam timing, and EGR valve position are not moved while spark timing is retarded from MBT spark timing and engine air mass flow is commanded to a constant value.

At 426, method 400 holds spark timing at or near MBT spark timing and the engine air mass flow rate is increased so that engine output torque matches the desired engine torque to meet the increased engine load. Engine air mass flow rate may be increased via opening a throttle, indexing an intake cam, or a combination of throttle and cam timing adjustments. It should be noted that spark timing may be slightly retarded from MBT spark timing when knock is impending or present. Method 400 proceeds to 434 after the engine air mass flow rate is adjusted.

At 428, method 400 decreases the engine air mass flow rate toward a desired engine air mass flow rate. In one example, the desired engine air mass flow rate is the engine air mass flow rate that provides the desired heat flux from the engine to the exhaust after treatment device. Thus, when there is a change in engine load and the engine load is decreasing, the engine air mass flow rate is decreased before spark timing is retarded so that fuel may be conserved.

The amount of engine air mass flow reduction corresponds to an amount of reduction in engine torque requested by the driver or occurring with withdrawal of an engine load. For example, if a transmission is disengaged from drive to neutral, engine torque to rotate the engine at the desired engine speed may be decreased. The decrease in engine torque may be equated to a decrease in engine air mass flow and fuel to rotate the engine. U.S. Pat. No. 7,063,062 provides one way to equate engine air mass flow and fuel amount to engine torque and is fully incorporated by reference for all intents and purposes. The engine mass air flow amount may be decreased up to the engine air mass flow rate that provides the desired heat flux from the engine to the exhaust after treatment device. Method 400 proceeds to 430.

At 430, method 400 judges whether or not the engine air mass flow rate is at or lower than a desired engine air mass flow rate where the desired heat flux is provided. If so the answer is yes, and method 400 proceeds to 432. Otherwise, the answer is no and method 400 proceeds to 434.

At 432, method 400 retards spark timing from MBT spark timing. The spark timing is retarded based on the estimated reduction in load applied to the engine. The spark timing may be retarded using the table of function as is described at 414 and that outputs the variable Spk_retard. Specifically, if the engine load is changed and engine torque is moved away from engine torque at MBT spark timing while the engine operates at the desired heat flux and engine air mass flow rate, the spark retard variable Spk_retard is increased and spark timing is retarded away from MBT spark timing. The present engine torque demand (e.g. a sum of engine friction torque, engine pumping torque, and external load applied to the engine) is divided by MBT_torque and the table describing spark retard based on fractional engine torque reduction is indexed so that a revised value of Spk_retard is output and spark is retarded from MBT spark timing. Method 400 proceeds to 434 after spark timing is retarded.

At 434, method 400 judges whether or not engine warm-up is complete. Engine warm-up may be judged complete when the engine reaches a threshold temperature or when an exhaust after treatment device reaches a threshold temperature. The threshold temperature of the exhaust after treatment device may be a temperature where the efficiency of the exhaust after treatment device is greater than a threshold efficiency. If engine warm-up is judged complete the answer is yes and method 400 proceeds to 436. Otherwise, the answer is no and method 400 returns to 418.

At 436, method 400 adjusts engine air mass flow rate and spark based on engine torque demand and engine speed. Since the engine warm-up is complete, a desired heat flux rate may not be required again after engine start unless the engine temperature is reduced to less than a threshold temperature or unless the exhaust after treatment device temperature is reduced to less than a threshold temperature. Method 400 exits after engine air mass flow and spark are adjusted based on engine speed and engine torque demand.

In this way, an engine may be operated at a substantially constant exhaust heat flux rate and engine air mass flow rate via adjusting engine spark timing until engine load or torque reaches a threshold level. After the threshold torque level is reached, the engine air flow rate may be increased. If the engine load or torque demand decreases, the engine air mass may be reduced until a desired engine air mass that provides a desired level of engine heat flux is reached. Spark timing may be reduced thereafter to further adjust engine torque to the demanded engine torque and to control engine idle speed.

Referring now to FIG. 5, a flowchart of a method for diagnosing engine starting according to the method of FIG. 4 is shown. The method is executable via instructions in a controller such as is shown in FIG. 1.

At 502, engine operating conditions are determined. Engine operating conditions may include but are not limited to engine speed, engine load, engine air mass flow rate, engine temperature, exhaust after treatment device temperature, and ambient air temperature. Method 500 proceeds to 504 after engine operating conditions are determined.

At 504, method 500 judges whether or not the engine is operating in a engine and/or catalyst heating mode. In one example, the engine may be in an engine heating mode when the engine temperature is less than a threshold temperature or when a temperature of an exhaust after treatment device is less than a threshold temperature. If method 500 judges the engine is in a heating mode, the answer is yes and method 500 proceeds to 506. Otherwise, the answer is no and method 500 proceeds to exit.

At 506, method 500 determined the engine heat flux. In one example, the engine heat flux is determined as described at 412. In other examples, the engine heat flux may be based on engine load, engine speed, engine air-fuel ratio, and engine spark timing. For example, one or more functions may be indexed that contain empirically determined exhaust gas temperatures that may be indexed via engine speed, engine load, engine air-fuel ratio, and engine spark timing. Method 500 proceeds to 508 after the engine heat flux is determined.

At 508, method 500 judges whether or not engine heat flux is greater than a first threshold. The first threshold may be a rate of heat flux that increases an exhaust after treatment device temperature at a desire rate. In other examples, the first threshold engine heat flux rate may be based on other criteria. If method 500 judges the engine heat flux rate is not greater than the first threshold, the answer is no and method 500 proceeds to 522. Otherwise, the answer is yes and method 500 proceeds to 510.

At 522, method 500 indicates that there is engine/engine after treatment heating deficiency. The heating deficiency may be indicated via a light or a message on a display that is provided to the driver. Thus, if the engine is not outputting heat at the expected rate, the driver is notified and method 500 exits.

At 510, method 500 judges whether or not engine heat flux is less than a second threshold amount. The second threshold amount may be set at a heat flux rate that is capable of heating the catalyst at a rate that allows the engine and vehicle to meet emission standards plus a heat flux offset amount to account for engine variability and variability in engine operating conditions. If method 500 judges that the engine heat flux rate is less than the second threshold amount, the answer is yes and method 500 exits. Otherwise, the answer is no and method 500 proceeds to 512.

Thus, 508 and 510 bracket the engine heat flux rate to determine if engine heat flux is in a desire range. If so, method 500 exits and no issues are reported. However, if the engine heat flux is less than desired, a heating deficiency is indicated. If engine heat flux is greater than desired, method 500 proceeds to 512 to attempt to determine the source of the additional engine heat flux.

At 512, method 500 judges whether or not engine air mass flow rate is greater than desired. The engine air mass flow rate may be determined via a mass air flow sensor or via the ideal gas law and a MAP sensor. If method 500 judges excess air flow is present the answer is yes and method 500 proceeds to 514. Otherwise, method 500 proceeds to 516. It should be noted that excess engine air flow may occur due to a leak in an engine air intake system, for example.

At 514, method 500 indicates a condition of additional engine and/or exhaust after treatment heating beyond a desired amount and that excess air may be present such that engine heat flux is greater than may be desired. The indication may be provided to the driver via a message on a display or a light.

At 516, method 500 judges whether or not the engine spark timing is retarded more than an expected amount. However, since spark retard has a much smaller affect on engine heat flux as compared to engine air mass flow, spark timing more retarded than expected may be an indicator of other sources that may affect engine heat flux. In one example, engine spark timing during the engine/exhaust heating mode may be retarded more than is expected if a fuel supplied to the engine has higher energy content than is expected or estimated. Conversely, if spark is not retarded more than is expected and engine heat flux is higher than expected, the fuel type may be misjudged. If method 500 judges spark is retarded more than expected, the answer is no and method 500 proceeds to 520. Otherwise, the answer is yes and method 500 proceeds to 518.

At 520, method 500 inquires as to a value of an adaptive fuel adjustment parameter to determine if the additional engine heat flux may be attributable to a fuel type. If the fuel type is different than expected, the desired engine air mass flow rate may be adjusted to compensate for the fuel type during subsequent engine starts. For example, the engine air mass flow rate may be reduced if it is determined that the fuel type varies from an expected fuel type. Specifically, if a fuel adjustment parameter takes a value of one for an expected fuel (e.g., gasoline) and a value of 0.9 for a different fuel (e.g., gasoline mixed with alcohol). The engine air mass flow rate may be increased during a subsequent engine start because of the lower heating capacity of alcohol mixed in the fuel. Method 500 proceeds to exit after the fuel composition is checked.

At 518, method 500 indicates that additional engine heat flux and exhaust after treatment device heating as well as additional spark retard are being provided based on engine heat flux being greater than may be desired. Additional heat flux from the engine may increase engine fuel consumption and may provide only a small amount of emission reduction. Therefore, it may be desirable to notify a driver that the engine is heating at a rate that may be higher than desired. An indication of additional engine heat flux and exhaust after treatment device heating may be provided to a driver via a light or a message on a display.

Thus, the methods of FIGS. 4 and 5 provide for an engine starting method, comprising: providing a substantially constant air mass to the engine after engine run-up until a predetermined condition; adjusting ignition timing to provide a torque to achieve a desired engine idle speed while the engine inducts the substantially constant air mass; and advancing spark timing toward MBT timing in response to an increase in engine torque while the engine inducts the substantially constant air mass. In this way, an exhaust after treatment device may be heated substantially the same way from engine start to engine start during varying engine operating conditions.

The engine starting method also includes where the predetermined condition is a state of an exhaust after treatment device, and where a throttle position is held substantially constant, a cam timing is held substantially constant, is held substantially constant to provide the substantially constant air mass, and where adjusting ignition timing to provide the torque to achieve the desired engine idle speed while the engine inducts the substantially constant air mass includes retarding ignition timing from MBT timing. The engine starting method also includes where the state of the exhaust after treatment device is a temperature where an efficiency of the exhaust after treatment device is greater than a threshold efficiency.

In some examples, the engine starting method includes where the substantially constant air mass is based on a desired engine heat flux, and where advancing spark timing toward MBT timing is also responsive to engine idle speed. The engine starting method also includes where the substantially constant air mass is an air mass that provides for a threshold vacuum level to operate one or more vacuum consumers. The engine starting also includes where the substantially constant air mass is different from a first engine start to a second engine start.

The methods of FIGS. 4 and 5 also provide for an engine starting method, comprising: inducting air to an engine at a substantially constant flow rate after engine start; adjusting ignition timing to provide a desired engine speed; advancing spark until MBT timing in response to an increasing engine load while the engine inducts air at the substantially constant flow rate; and increasing engine air flow to meet engine load after spark timing substantially reaches MBT timing. In this way, engine output can be increased in response to a torque request after spark timing reaches MBT timing.

The engine starting method also includes where air inducted to the engine is held substantially constant via adjusting a position of a throttle. The engine starting method also includes where MBT spark timing is adjusted based on engine speed and load. The engine starting method further comprises reducing engine air flow in response to a decrease in engine load while holding spark timing at substantially MBT spark timing. In this way, engine air mass flow may be reduced before spark timing is retarded so that engine efficiency is held high.

The engine starting method further comprises retarding spark timing from MBT spark timing when engine air flow is reduced to a threshold engine air flow. The engine starting method further comprises adjusting engine air flow and spark timing in response to engine speed and engine torque demand after the engine reaches a predetermined condition. The engine starting method further comprises providing an indication of engine heating greater than a threshold in response to heat flux provided by the engine. The engine starting method also further comprises providing an indication of engine heating less than a threshold in response to heat flux provided by the engine.

As will be appreciated by one of ordinary skill in the art, methods described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine starting method, comprising:
    providing a constant air mass to an engine after engine run-up until a predetermined condition, the constant air mass provided at a first altitude and a second altitude, a desired amount of vacuum provided by the engine at the first altitude, an additional amount of vacuum than the desired amount of vacuum provided by the engine at the second altitude, the second altitude lower than the first altitude;
    adjusting ignition timing to provide a torque to achieve a desired engine idle speed while the engine inducts the constant air mass; and
    advancing spark timing toward minimum spark advance timing for best engine torque (MBT) timing in response to an increase in engine torque while the engine inducts the constant air mass.

2. The engine starting method of claim 1, where the predetermined condition is a state of an exhaust after treatment device, and where a throttle position is held constant, a cam timing is held constant to provide the constant air mass, and where adjusting ignition timing to provide the torque to achieve the desired engine idle speed while the engine inducts the constant air mass includes retarding ignition timing from MBT timing.

3. The engine starting method of claim 2, where the state of the exhaust after treatment device is a temperature where an efficiency of the exhaust after treatment device is greater than a threshold efficiency, and further comprising evaluating a fuel composition in response to engine heat flux being greater than desired.

4. The engine starting method of claim 1, where the constant air mass is based on a desired engine heat flux, where advancing spark timing toward MBT timing is also responsive to engine idle speed, and where the desired engine heat flux is further based on a desired intake manifold vacuum.

5. The engine starting method of claim 4, where the constant air mass is an air mass that provides for a threshold vacuum level to operate one or more vacuum consumers.

6. The engine starting method of claim 1, where the constant air mass is different from a first engine start to a second engine start, and further comprising reducing the constant air mass in response to a fuel type varying from an expected fuel type.

7. An engine starting method, comprising:
    inducting air to an engine at a constant flow rate after engine start;
    adjusting ignition timing to provide a desired engine speed while inducting air to the engine at the constant flow rate;
    advancing spark until providing minimum spark advance timing for best engine torque (MBT) timing in response to an increasing engine load while the engine inducts air at the constant flow rate, then increasing engine air flow to meet the increasing engine load while holding spark timing at MBT timing after spark timing is advanced to MBT timing in response to the increasing engine load; and
    providing an indication of engine heating greater than a desired amount in response to heat flux provided by the engine greater than a threshold amount, and reducing the constant flow rate in response to a fuel type varying from an expected fuel type.

8. The engine starting method of claim 7, where air inducted to the engine is held constant via adjusting a position of a throttle, and further comprising indicating a condition of heat flux greater than is desired from the engine when the engine is commanded to induct the constant flow rate.

9. The engine starting method of claim 7, where MBT spark timing is adjusted based on engine speed and load, and where the constant flow rate is based on a mass of an exhaust after treatment device and a desired amount of time to heat the exhaust after treatment device to a desired temperature.

10. The engine starting method of claim 7, further comprising reducing engine air flow in response to a decrease in engine load while holding spark timing at MBT spark timing until an engine air mass flow rate where a desired heat flux is provided, then retarding spark timing.

11. The engine starting method of claim 10, further comprising evaluating a fuel composition in response to engine heat flux being greater than is desired.

12. The engine starting method of claim 7, further comprising adjusting engine air flow and spark timing in response to engine speed and engine torque demand after the engine reaches a predetermined condition, and further comprising indicating a condition of heat flux less than is desired from the engine when the engine is commanded to induct the constant flow rate.

13. The engine starting method of claim 7, further comprising providing the indication of engine heating less than a threshold in response to heat flux provided by the engine.

14. A system for starting an engine coupled to a transmission, comprising:
    an engine;
    an exhaust after treatment device coupled to the engine; and
    a controller including executable instructions stored in non-transitory memory to provide a constant air mass flow rate at a first altitude and a second altitude, a desired amount of vacuum provided by the engine at the first altitude, an additional amount of vacuum than the desired amount of vacuum provided at the second altitude, the second altitude lower than the first altitude.

15. The system of claim 14, where the controller includes further instructions to adjust ignition timing in response to a change in engine load.

16. The system of claim 15, where the controller includes further instructions to advance spark timing to minimum spark advance timing for best engine torque (MBT) spark timing and hold spark timing at MBT spark timing while increasing engine air flow in response to the change in engine load.

17. The system of claim 14, where the controller includes further instructions to retard spark timing from minimum spark advance timing for best engine torque (MBT) spark timing while the engine is providing a constant heat flux.

18. The system of claim 14, further comprising additional controller instructions for evaluating a fuel composition in response to engine heat flux being greater than desired.

19. The system of claim 18, further comprising a throttle coupled to the engine and further controller instructions to operate the throttle to provide constant air flow to the engine via the throttle.

* * * * *